US009579542B2

(12) United States Patent
Quinn et al.

(10) Patent No.: US 9,579,542 B2
(45) Date of Patent: Feb. 28, 2017

(54) NETWORKED GAME SYSTEM HAVING MULTIPLE FULL-BODY EXERCISE APPARATUS CONTROLLERS

(71) Applicants: Robert Quinn, Itasca, IL (US); Ivan Kiselev, Itasca, IL (US)

(72) Inventors: Robert Quinn, Itasca, IL (US); Ivan Kiselev, Itasca, IL (US)

( * ) Notice: Subject to any disclaimer, the term of this patent is extended or adjusted under 35 U.S.C. 154(b) by 0 days.

(21) Appl. No.: 14/585,072

(22) Filed: Dec. 29, 2014

(65) Prior Publication Data
US 2016/0184633 A1 Jun. 30, 2016

(51) Int. Cl.
A63B 24/00 (2006.01)
A63F 13/67 (2014.01)
A63F 13/45 (2014.01)
A63F 13/211 (2014.01)
A63F 13/30 (2014.01)
A63F 13/80 (2014.01)
(Continued)

(52) U.S. Cl.
CPC ........ *A63B 24/0062* (2013.01); *A63F 13/211* (2014.09); *A63F 13/218* (2014.09);
(Continued)

(58) Field of Classification Search
CPC . A63B 24/00; A63B 24/0062; A63B 24/0084; A63B 24/0087; A63B 2024/0096;
(Continued)

(56) References Cited

U.S. PATENT DOCUMENTS 5,816,372 A 10/1998 Carlson et al.
5,888,172 A * 3/1999 Andrus ................ A61B 5/6887
434/247
(Continued)

OTHER PUBLICATIONS

Ahmadkhanlou, Farzad "Design, Modeling and Control of Magnetorheological Fluid-Based Force Feedback Dampers for Telerobotic Systems" (2008).
(Continued)

*Primary Examiner* — Glenn Richman
(74) *Attorney, Agent, or Firm* — The Polit Law Group; Robert B. Polit

(57) ABSTRACT

An exercise network system is disclosed that comprises an electronic data communication link and a plurality of electronic video game workout systems. One or more of the plurality of electronic video game workout systems is configured for communication with at least one other video game workout system another over the electronic data communication link to transmit and receive data used for game play at each of the plurality of electronic video game workout systems. One or more of the electronic video game workout systems is further configured for execution of a full-body workout using a plurality of independently operable appendicular members configured for engagement with respective limbs of a user. Each of the plurality of appendicular members is movable in a degree of freedom independent of other ones of the plurality of appendicular members. Resistance on each of the plurality of appendicular members the is adjustable along and/or about its degree of freedom during game play based on locally generated data and data communicated over the electronic data communication link from other electronic video game workout systems.

12 Claims, 18 Drawing Sheets

(51) Int. Cl.
*A63F 13/42* (2014.01)
*A63F 13/218* (2014.01)
*A63F 13/285* (2014.01)
*A63F 9/24* (2006.01)

(52) U.S. Cl.
CPC ............ *A63F 13/285* (2014.09); *A63F 13/30* (2014.09); *A63F 13/42* (2014.09); *A63F 13/45* (2014.09); *A63F 13/67* (2014.09); *A63F 13/80* (2014.09); *A63B 2024/0096* (2013.01); *A63F 2009/2447* (2013.01); *A63F 2009/2488* (2013.01)

(58) Field of Classification Search
CPC ........ A63F 13/67; A63F 13/45; A63F 13/211; A63F 13/30; A63F 13/80; A63F 13/42; A63F 13/218; A63F 13/285; A63F 2009/2447; A63F 2009/2488
See application file for complete search history.

(56) References Cited

U.S. PATENT DOCUMENTS

| | | | |
|---|---|---|---|
| 5,890,995 A * | 4/1999 | Bobick | A63B 24/0084 434/247 |
| 6,283,859 B1 | 9/2001 | Carlson et al. | |
| 6,450,922 B1 | 9/2002 | Henderson et al. | |
| 6,923,723 B2 | 8/2005 | Goden et al. | |
| 7,113,166 B1 | 9/2006 | Rosenberg et al. | |
| 7,870,809 B2 | 1/2011 | Rice | |
| 8,308,558 B2 | 11/2012 | Thorner | |
| 8,647,240 B2 * | 2/2014 | Heidecke | A63B 21/0053 482/4 |
| 9,272,180 B2 * | 3/2016 | Eschenbach | A63B 22/0056 |
| 2006/0009891 A1 | 1/2006 | Pawlak et al. | |
| 2010/0035726 A1 * | 2/2010 | Fisher | A63B 24/0084 482/8 |
| 2010/0267519 A1 * | 10/2010 | Johnson, II | A63B 22/001 482/8 |
| 2010/0273616 A1 * | 10/2010 | Schneider | A63B 22/0002 482/133 |
| 2011/0077129 A1 * | 3/2011 | Martens | A63B 22/00 482/8 |
| 2012/0109025 A1 | 5/2012 | Weinberg et al. | |
| 2013/0190135 A1 * | 7/2013 | Pryor | B60K 35/00 482/8 |
| 2013/0229272 A1 | 9/2013 | Elliott | |
| 2014/0194250 A1 * | 7/2014 | Reich | A63B 24/0087 482/5 |

OTHER PUBLICATIONS

U.S. Appl. No. 14/585,103, filed Dec. 29, 2014, "Game System Having Full-Body Exercise Apparatus Controller With Independently Operable Appendiculr Members".

U.S. Appl. No. 14/585,117, filed Dec. 29, 2014, "Full-Body Exercise System Including a Plurality of Independently Operable Appendicular Members".

* cited by examiner

NETWORKED GAME SYSTEM HAVING MULTIPLE FULL-BODY EXERCISE APPARATUS CONTROLLERS

BACKGROUND

There are varieties of exercise devices configured to provide substantial physical workouts to a user to maintain and/or increase the user's fitness level. Stepping machines, treadmills, and many cycling machines are principally configured to exercise the lower portion of the body. Other machines, such as elliptical machines, and some rowing machines, provide a full-body workout in that they are configured to exercise the lower portion of the body by applying resistance to, or requiring movement of, one or both legs of the user and to exercise the upper portion of the body by applying resistance to, or requiring movement of one or both of the arms of the user.

Current full-body workout machines are designed to require direct coordination between simultaneous motion of the limbs. For example, elliptical machines are designed so that the motion of each limb is directly dependent on the motion of all other limbs of the user. This dependency is necessary to achieve the desired elliptical motion between the legs and arms of the user. No provision is made for the motion of one limb independent of the movement of all other limbs.

Further, the existing full-body workout machines do not have truly adjustable resistance features. Again, with respect to elliptical machine, the resistance experienced by one leg of the user is the same as the resistance experienced by the other leg of the user. Likewise, the resistance experienced by one arm of the user is the same as the resistance experienced by the other arm of the user. No provision is made for the application of a resistive force to one limb independent of the resistive force experienced by all other limbs.

Exercise on existing full-body exercise apparatus tends to be very repetitive. This repetition can distort perception of the total workout time, making it seem longer than it truly is. To reduce this distortion, gyms often play music and show television near the exercised apparatus. However, these techniques are often not completely successful since they only distract the user from the workout as opposed to making the direct engagement between the user and the exercise machine more enjoyable.

SUMMARY

An exercise network system is disclosed that comprises an electronic data communication link and a plurality of electronic video game workout systems. One or more of the plurality of electronic video game workout systems is configured for communication with at least one other video game workout system another over the electronic data communication link to transmit and receive data used for game play at each of the plurality of electronic video game workout systems. One or more of the electronic video game workout systems is further configured for execution of a full-body workout using a plurality of independently operable appendicular members configured for engagement with respective limbs of a user. Each of the plurality of appendicular members is movable in a degree of freedom independent of other ones of the plurality of appendicular members. Resistance on each of the plurality of appendicular members the is adjustable along and/or about its degree of freedom during game play based on locally generated data and data communicated over the electronic data communication link from other electronic video game workout systems.

DETAILED DESCRIPTION

Figure 1:
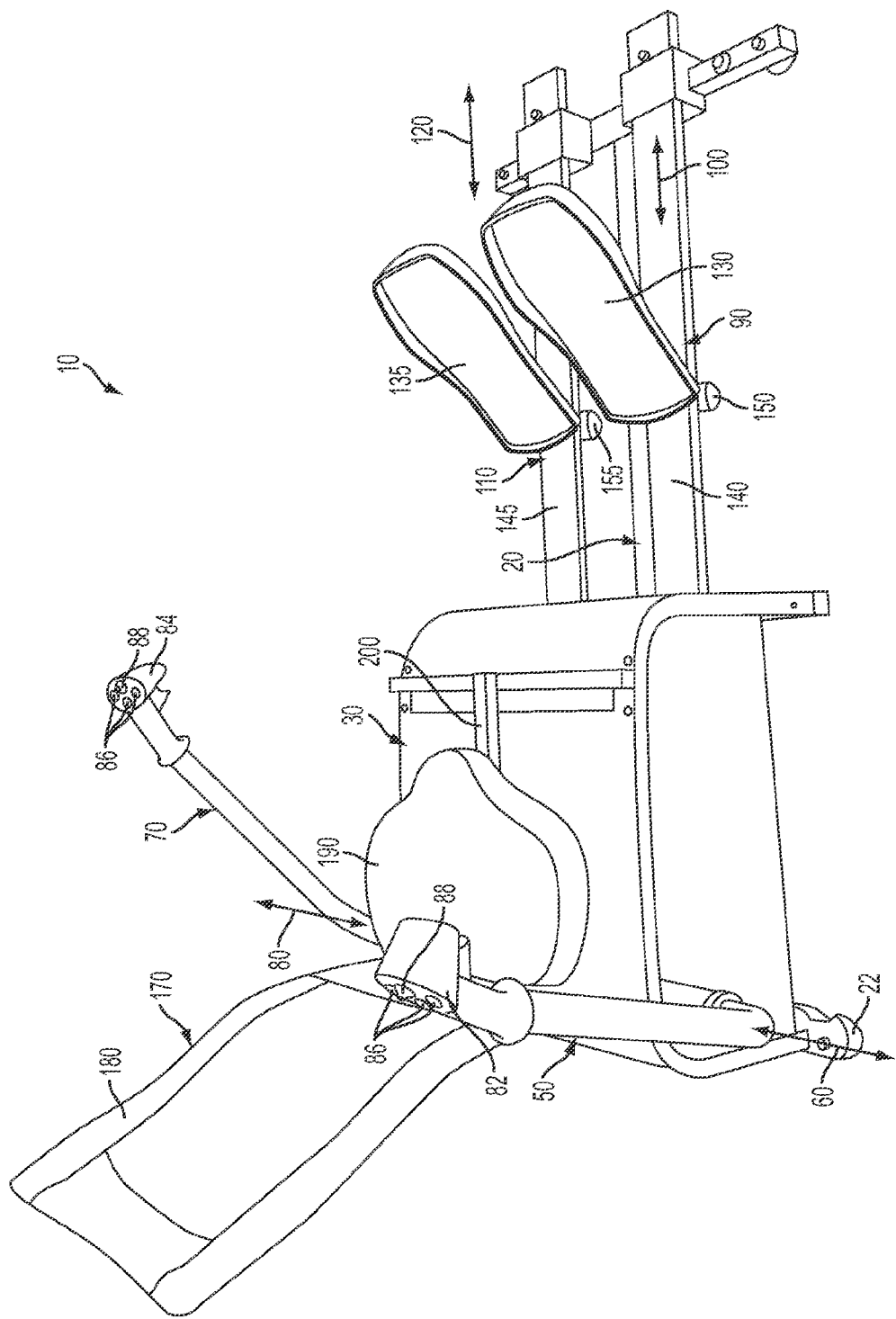
FIG. 1 is a perspective view of one example of a full-body exercise apparatus.

FIG. 1 is a perspective view of one example of the exterior portions of a full-body exercise apparatus 10. As shown, the full-body exercise apparatus 10 includes a frame 20, which is configured to support or be integrated with, various other elements of the full-body exercise apparatus 10. The frame 20 may be in the form of a single integral structure, separate structures that, for example, are in a fixed relationship with one another, or any other structure used to support or integrate with various components of the full-body exercise apparatus 10. The full-body exercise apparatus 10 may also include one or more transport members to facilitate moving it to and from various locations. Here, the transport members are in the form of a plurality of wheels 22 (only one shown in FIG. 1).

In FIG. 1, the frame 20 includes a housing 30, which may partially or completely enclose resistive components of the full-body exercise apparatus 10. Various examples of the resistive components are set forth below.

A plurality of appendicular members extends from the frame and are configured for engagement with a respective limb of the user. Each of the appendicular members is movable in a degree of freedom independent of other ones of the plurality of appendicular members. Here, the plurality of appendicular members include a first appendicular member 50 that is configured for rotation by a first arm of a user about a first pivot axis 60. A second appendicular member 70 is configured for rotation by a second arm of a user about a second pivot axis 80. The first pivot axis 60 and second pivot axis 80 may be generally collinear. In this example, the first appendicular member 50 and second appendicular member 70 are disposed on opposite sides of the housing 30. One or both of the first appendicular member 50 and second appendicular member 70 may terminate at respective handgrips 82 and 84 to engage the hands of the user. As shown, one or both of the handgrips 82 and 84 may include a plurality of buttons 86 and/or mouse-like devices 88 that may be used to implement various functions associated with the full-body exercise apparatus 10.

The full-body exercise apparatus 10 may also include appendicular members used to provide a lower body workout. In FIG. 1, a third appendicular member 90 extends from the frame 20 and is configured to engage a first leg of the user. In this example, the third appendicular member 90 is movable along a first generally linear axis 100. Further, a fourth appendicular member 110 extends from the frame 20 and is configured to engage a second leg of the user. The fourth appendicular member 110 of this example is movable along a second generally linear axis 120. The first generally linear axis 100 and second generally linear axis 120 may be parallel with one another, and disposed horizontally or at an angle with respect to the horizon. The housing 30 may partially or completely enclose resistive elements associated with the third appendicular member 90 and the fourth appendicular member 110.

The third appendicular member 90 and fourth appendicular member 110 are both constructed in a similar manner. To this end, the third appendicular member 90 includes a pedal 130 connected to a sliding member 140 at joint 150. The fourth appendicular member 110 includes a pedal 135 connected to a sliding member 145 by a joint 155. With respect to the fourth appendicular member 110, it includes a pedal 130 connected to a sliding member 140 by a joint 150. The joints 150 and 155 may be fixed or configured for at least partial rotation about respective axes to allow flexion of the ankle of the user. The sliding member 140 is disposed on top of a rail (not shown in FIG. 1) so that the third appendicular member 90 is slidable along the rail in the direction of axis 100. Likewise, the sliding member 145 is disposed on top of a respective rail (not shown in FIG. 1) so that the fourth appendicular member 110 is slidable along the rail in the direction of axis 120.

The user is supported on the full-body exercise apparatus 10 by a seat 170. The seat 170 includes a back portion 180 and a saddle portion 190. The angles at which one or both of the back portion 180 and saddle portion 190 engage the user may be adjustable. Further, the horizontal position of the seat 170 may be adjusted along rail 200 as desired to place the user in a comfortable exercise position.

FIGS. 2-9 illustrate the plurality appendicular members in various positions. As shown in these figures, each appendicular member is movable independent of movement of other ones of the plurality of the appendicular members.

Figure 2:
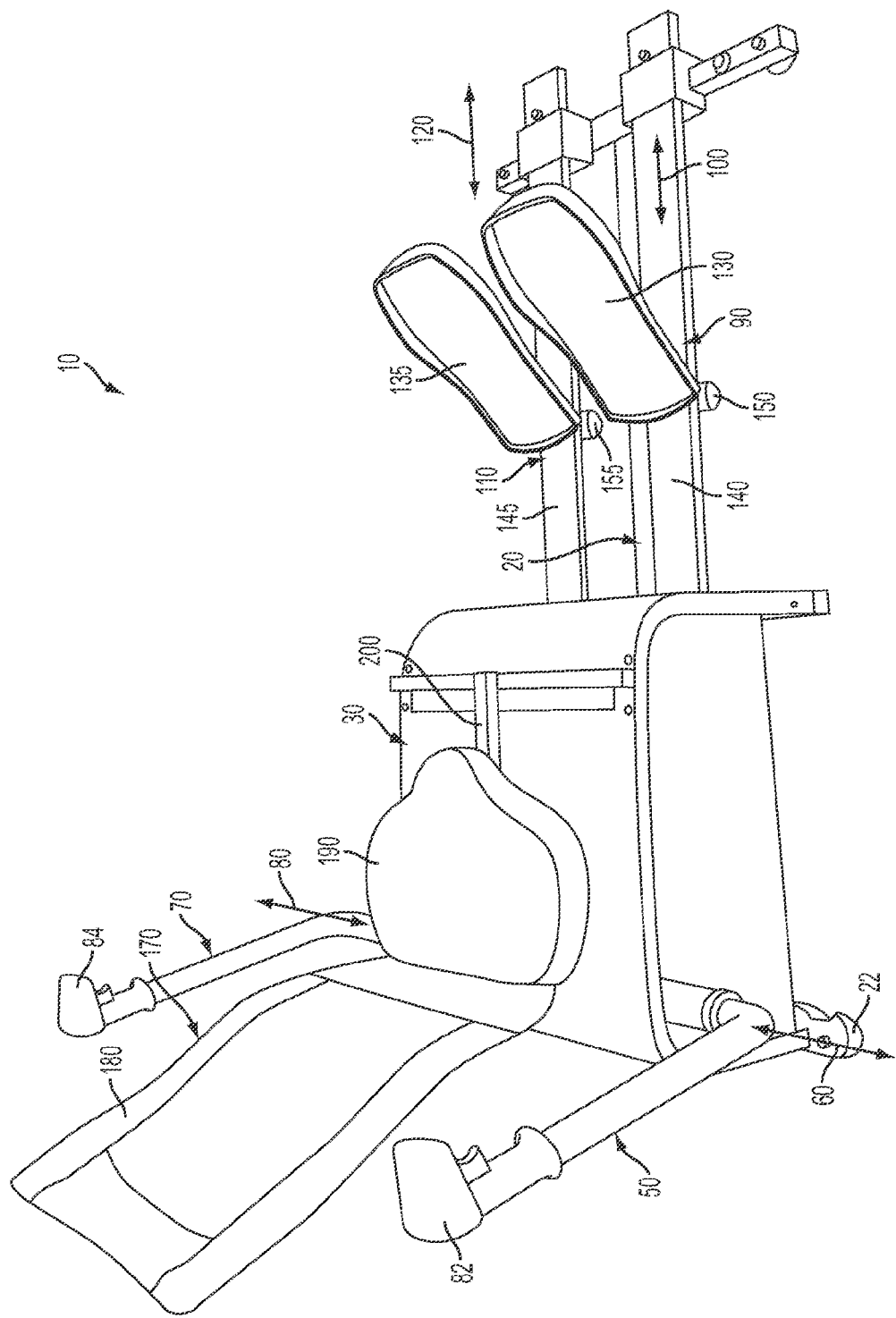
FIG. 2 illustrates the position of the appendicular members associated with the upper body of a user when they are each rotated to a retracted position.
Figure 3:
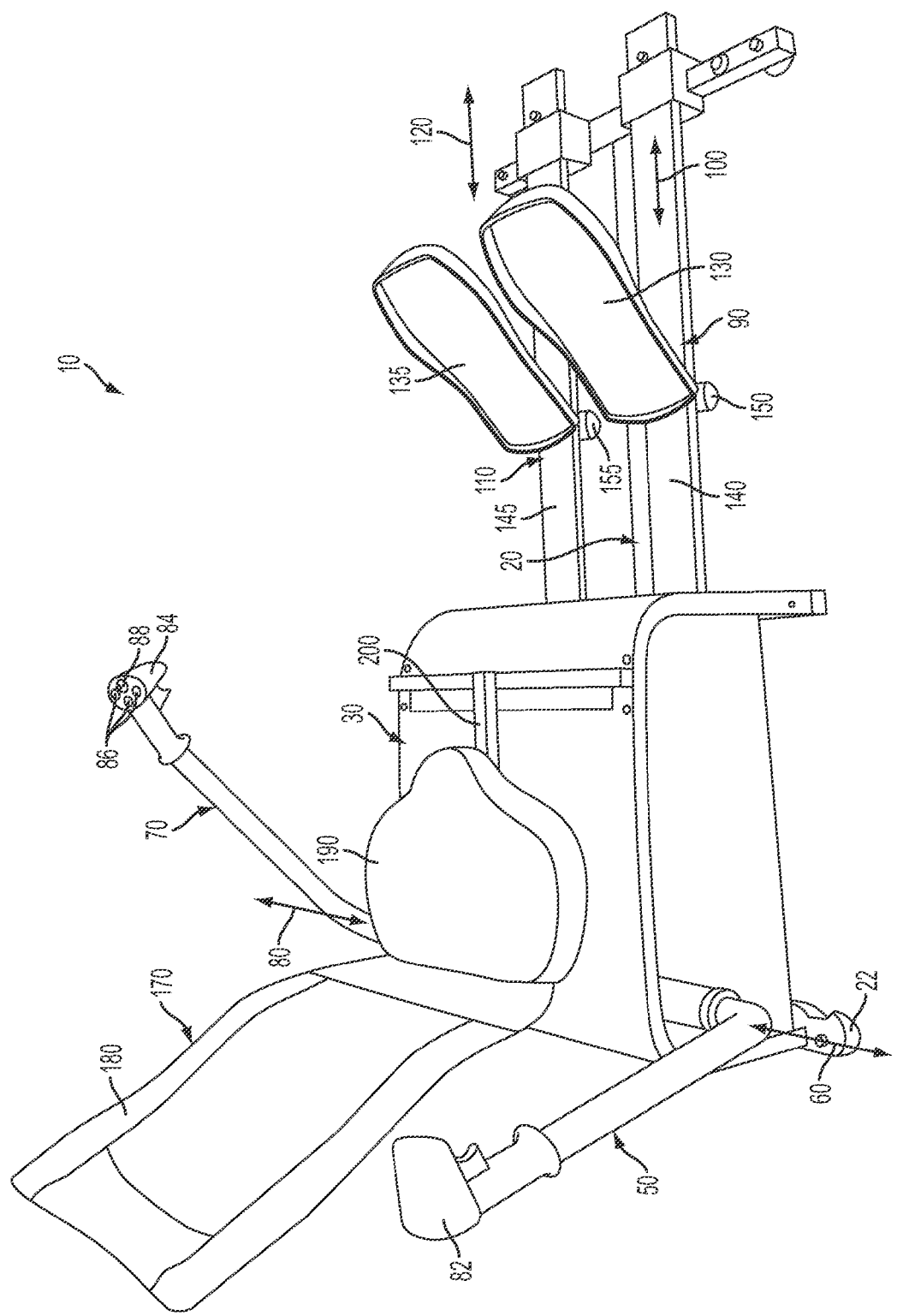
FIG. 3 illustrates the position of the appendicular members associated with the upper body of a user when the right arm is rotated to a refracted position and the left arm is rotated to an extended position.
Figure 4:
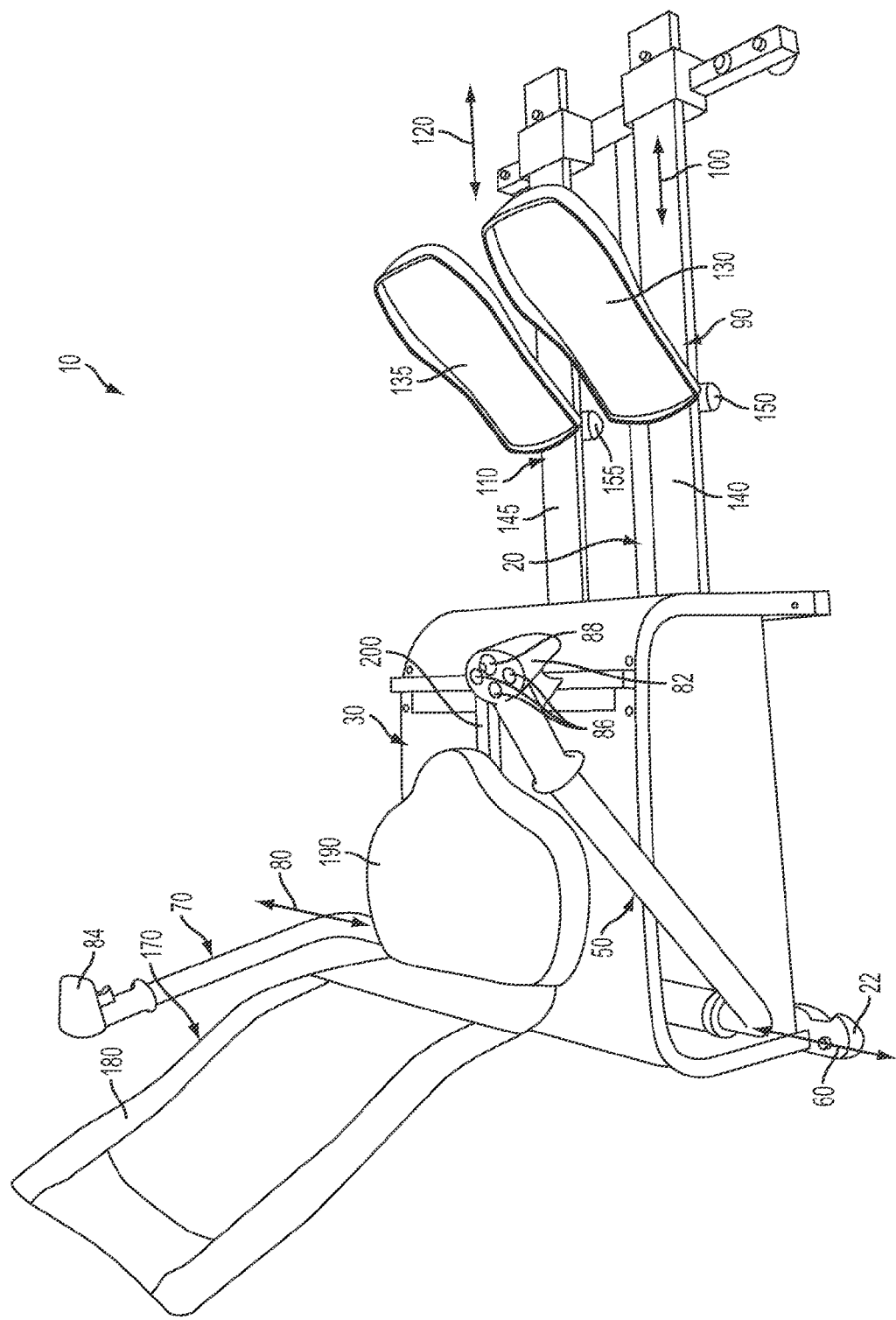
FIG. 4 illustrates the position of the appendicular members associated with the upper body of a user when the left arm is rotated to a retracted position and the right arm is rotated to an extended position.
Figure 5:
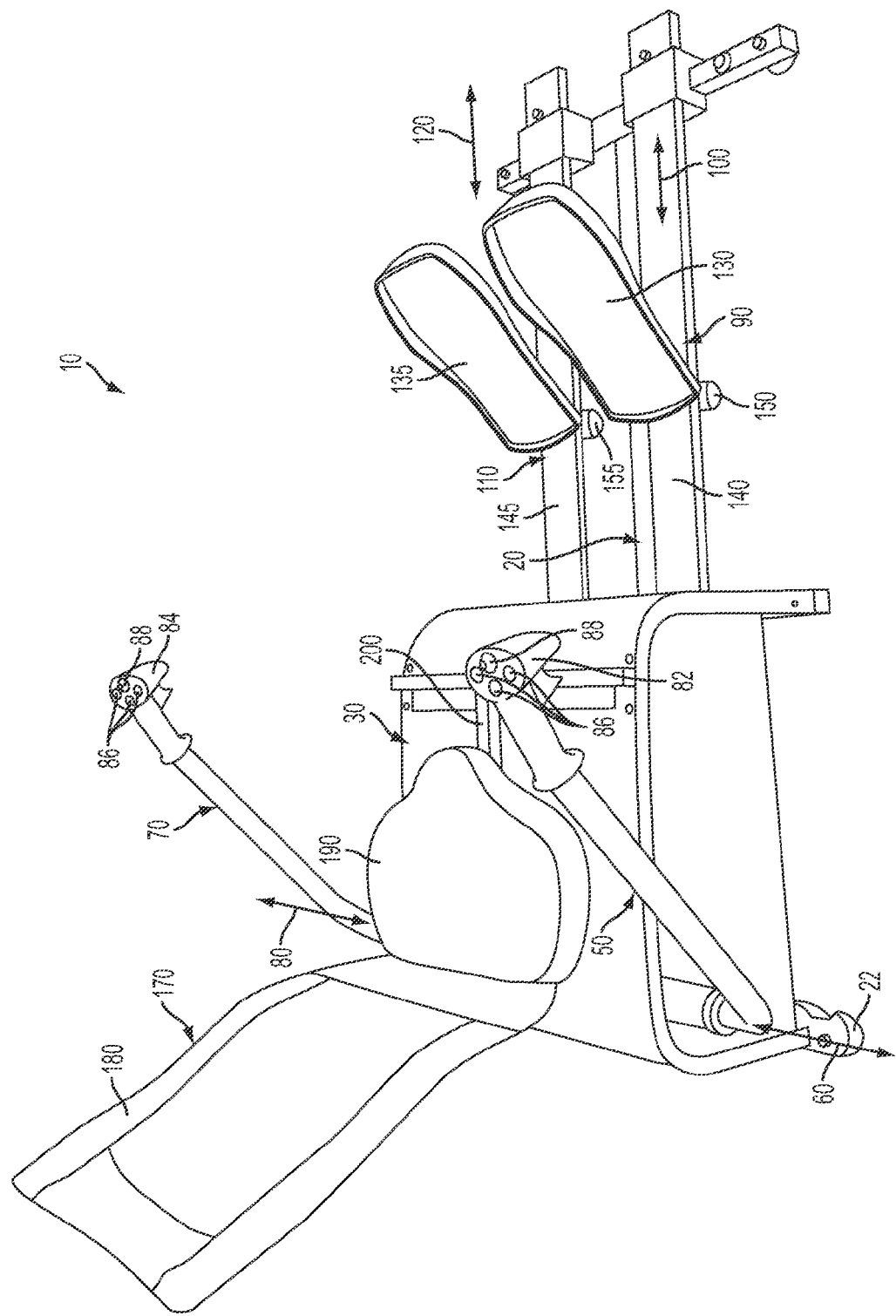
FIG. 5 illustrates the position of the appendicular members associated with the upper body of a user when both arms of the user are rotated to an extended position.

With respect to the appendicular members 50 and 70 associated with the upper body, FIG. 2 illustrates both the appendicular members 50 and 70 in a retracted position. FIG. 3 illustrates the appendicular member 50 for the right arm of the user in a retracted position and the second appendicular member 70 for the left arm rotated to an extended position. FIG. 4 illustrates the second appendicular member 70 for the left arm in a retracted position and the first appendicular member 50 for the right arm rotated to an extended position. FIG. 5 illustrates the first and second appendicular members 50 and 70 both rotated to extended positions.

Figure 6:
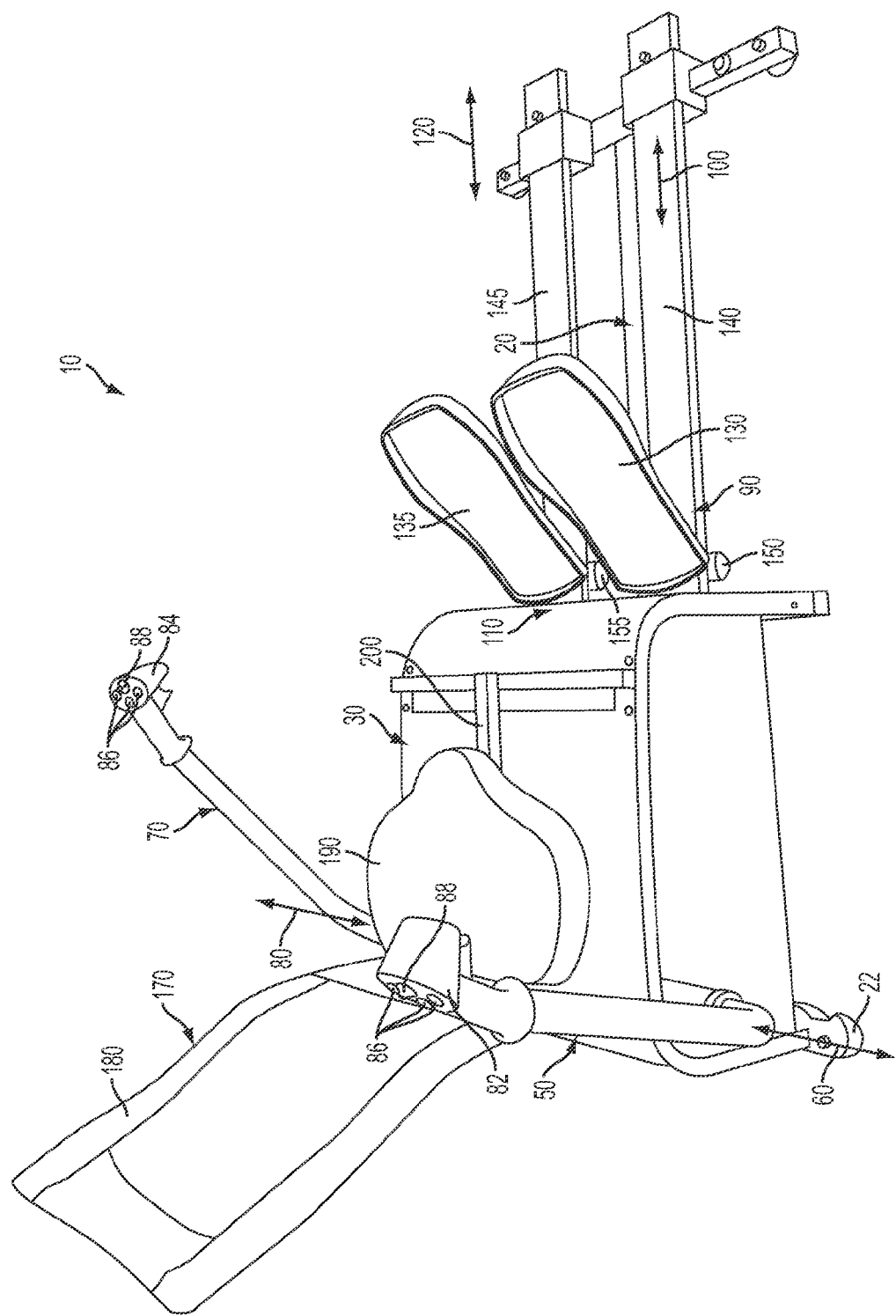
FIG. 6 illustrates the position of the appendicular members associated with the lower body of a user in a retracted position.
Figure 7:
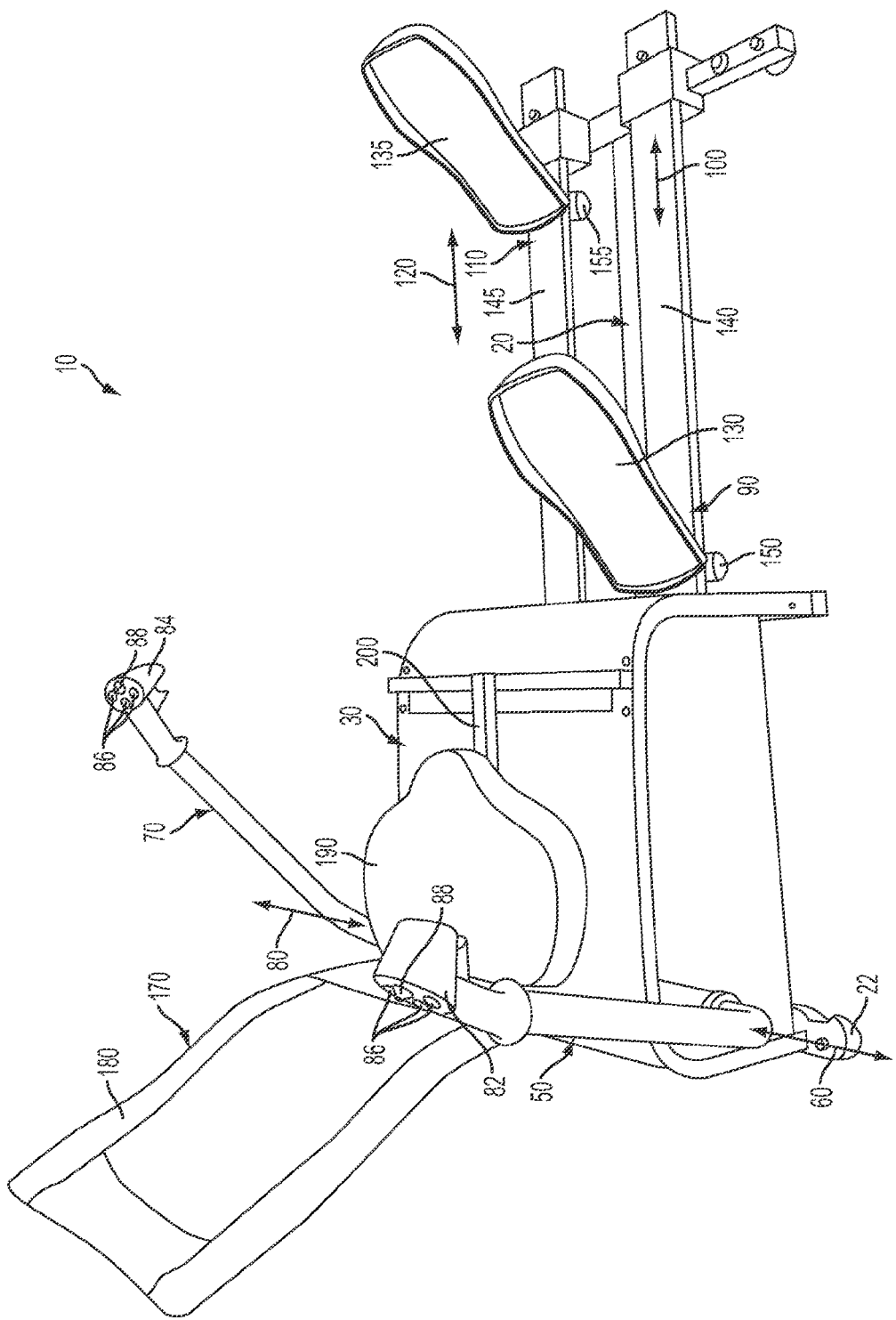
FIG. 7 illustrates the position of the appendicular members associated with the lower body of a user when the right leg is in a retracted position and the left leg is in an extended position.
Figure 8:
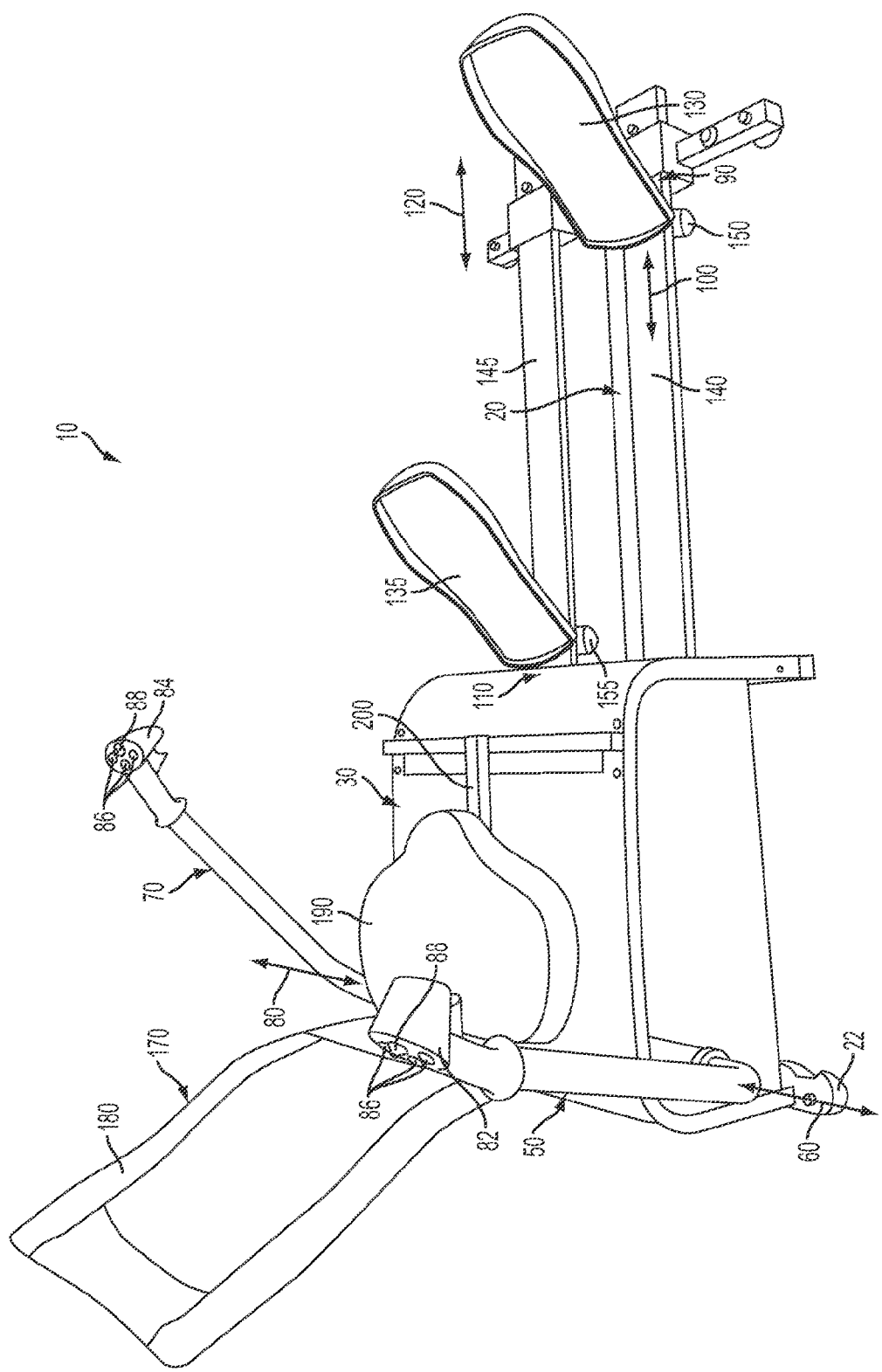
FIG. 8 illustrates the position of the appendicular members associated with the lower body of a user when the left leg is in a retracted position and the right leg is in an extended position.
Figure 9:
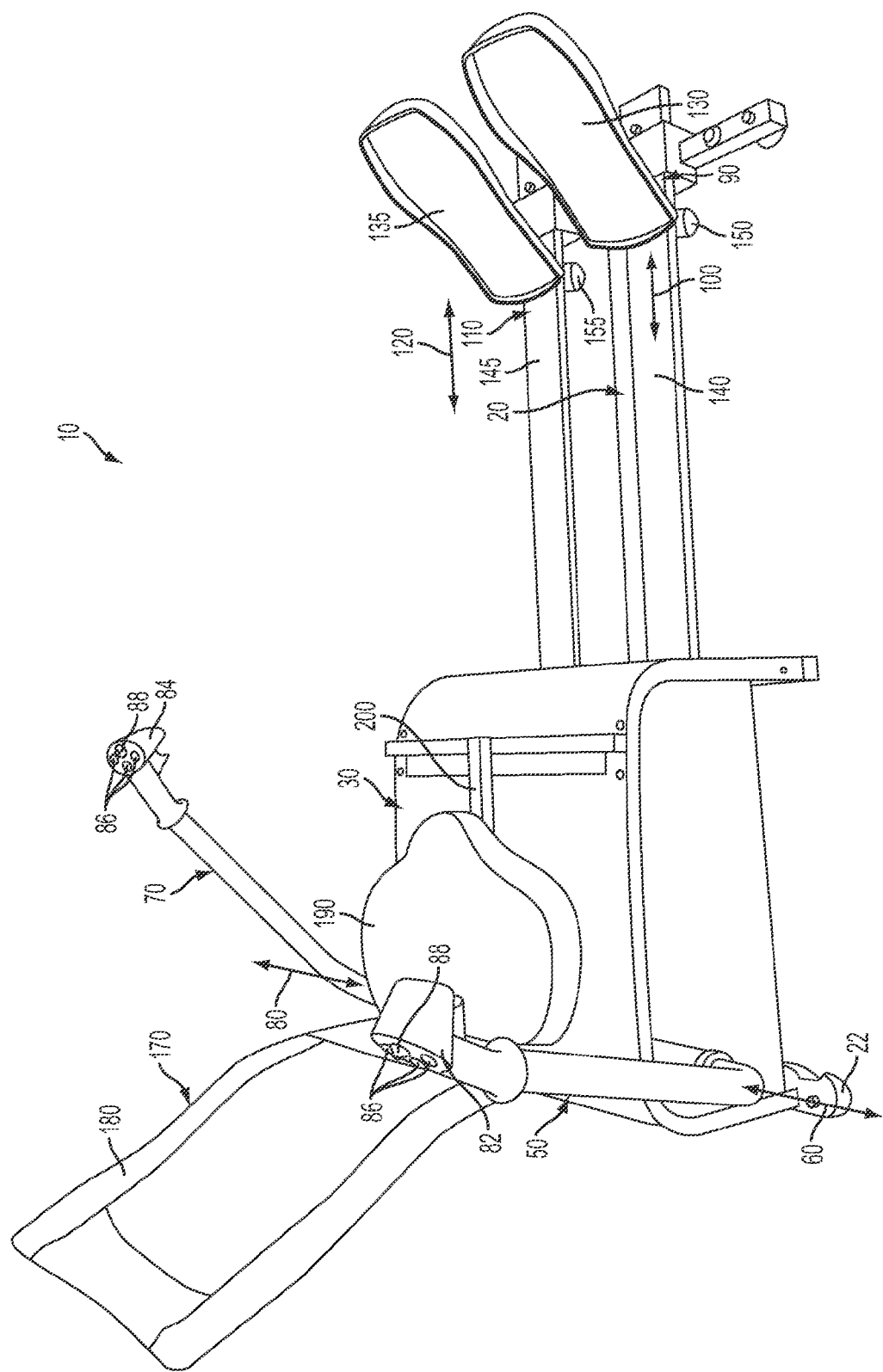
FIG. 9 illustrates the position of the appendicular members associated with the lower body of a user where both legs are in an extended position.

With respect to the third and fourth appendicular members 90 and 110 associated with the lower body, FIG. 6 illustrates the third and fourth appendicular members 90 and 110 in a retracted position. FIG. 7 illustrates the fourth appendicular member 110 in a retracted position and the third appendicular member 90 in an extended position. FIG. 8 illustrates the third appendicular member 90 in a refracted position and the fourth appendicular member 110 in an extended position. FIG. 9 illustrates both the third and fourth appendicular members 90 and 110 in an extended position.

Figure 10:
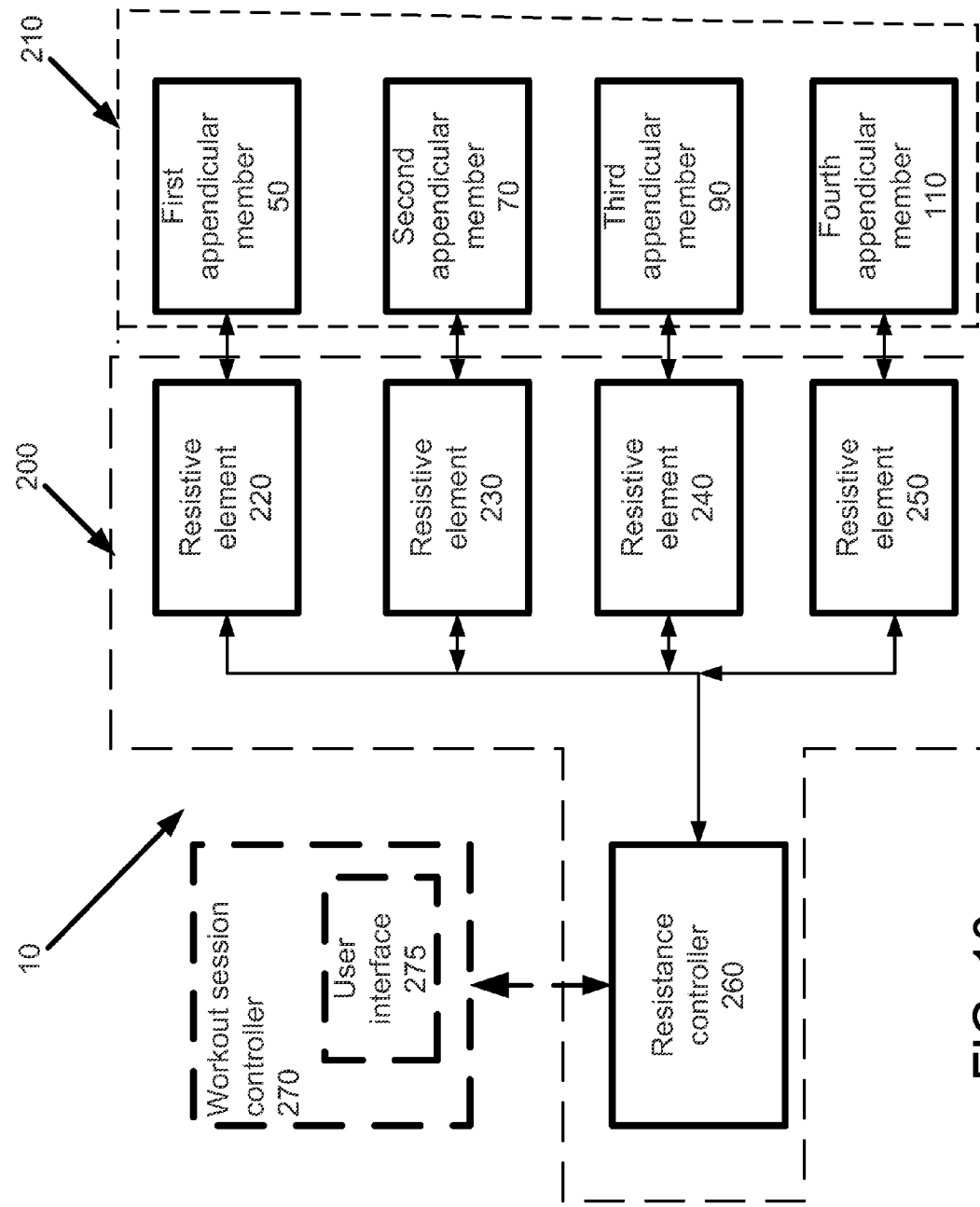
FIG. 10 is a schematic block diagram of a system that may be used to independently control the resistive force experienced by a user on each of the plurality of appendicular members.

FIG. 10 is a schematic block diagram of the full-body exercise apparatus 10 showing a resistance control system 200 that may be used to independently control the resistive force provided on each of the plurality of appendicular members in its respective degree of freedom. The resistance control system 200 may adjust the resistive forces in a generally continuous manner. In this example, a set of appendicular members 210 includes first appendicular member 50, second appendicular member 70, third appendicular member 90, and fourth appendicular member 110. Resistive element 220 is connected so as to apply a resistive force to the first appendicular member 50. Resistive element 230 is connected so as to apply a resistive force to the second appendicular member 70. Resistive element 240 is connected so as to apply a resistive force to the third appendicular member 90. Resistive element 250 is connected so as to apply a resistive force to the fourth appendicular member 110. One or more of the resistive elements 220, 230, 240, and 250 may be consolidated with one another so long as they are connected to apply independently controllable resistive forces to the appendicular members 50, 70, 90, and 110.

The resistive elements 220, 230, 240, and 250 may include any one of a variety of variable resistance structures. For example, one or more of the resistive elements 220, 230, 240, and 250 may be in the form of hydraulic and/or pneumatic actuators. Additionally, or in the alternative, the resistive elements may include one or more smart fluid-based actuators that, for example, are respectively associated with one or more of the plurality of appendicular members 50, 70, 90, and 110. In one example, the smart fluid-based actuators may include a smart-fluid selected from an electro-rheological fluid or a magneto-rheological fluid. Such smart fluid-based actuators may be used for resistive elements 220 and 230 to control the resistive forces experienced by the upper body of the user at the first appendicular member 50 and second appendicular member 70. Likewise, such smart fluid-based actuators may be used for resistive elements 240 and 250 to control the resistive forces experienced by lower body of the user at the third appendicular member 90 and fourth appendicular member 110. In one example, as will be explained below, resistive elements 240 and 250 may share common elements but, nevertheless, independently control the resistive forces experienced by the lower body of the user.

A resistance controller 260 may provide control signals to the resistive elements 220, 230, 240, and 250. The resistance controller 260 may send individual control signals to each of the resistive elements to set the resistive force applied by the resistive elements to their respective appendicular members. The control signals may be in an analog and/or digital format. For example, the control signals may be provided in the form of a current. Adjustable currents are particularly well suited when the resistive element is in the form of a smart-fluid actuator and/or a regenerative motor. Differing electric current magnitudes may be used to control the resistive force provided on each of the plurality of appendicular members so that each appendicular member has a different resistive force. The control signals may also be in a digital format, in which case the digital data transmitted to each resistive element may be converted in-situ and one or more of the plurality of appendicular members to an analog signal.

Optionally, the full-body exercise apparatus 10 may include a workout session controller 270 that is in communication with the resistance controller 260. In turn, the workout session controller 270 may include a user interface 275 used to allow user entry of a pre-programmed or customized workout session. The resistance controller 260 directs the resistive elements 220, 230, 240, and 250 to apply their respective resistive forces in accordance with the pre-programmed or customized workout session selected by the user.

Positional information for the third and fourth appendicular members 90 and 110 may be derived from a number of different sensor types that may be disposed at one or more locations. For example, the positions of the sliding members 140 and 145 may be detected using one or more magnetic or optical sensors 455. Additionally, or in the alternative, the positions of the third appendicular member 90 and fourth appendicular member 110 may be sensed by placing respective rheostats 460 and 465 in positions to co-rotate with cross-rods 330 and 335.

Figure 11:
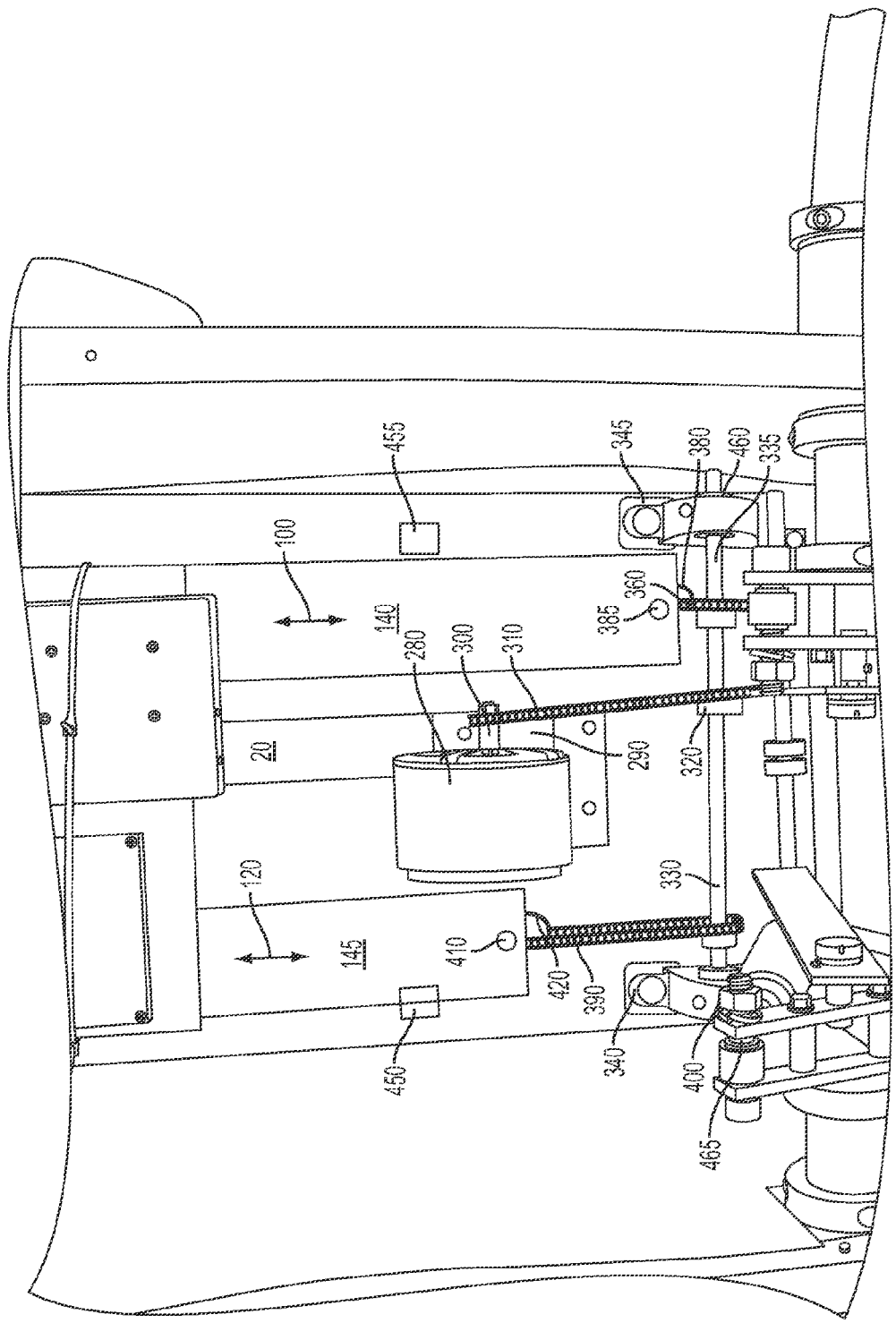
FIG. 11 shows one example of the resistance members and corresponding motion feedback associated with the third and fourth appendicular members.

FIG. 11 shows one manner in which the resistive elements 240 and 250 may be configured to allow independent movement of the third and fourth appendicular members 90 and 110 while sharing various components. Here, the resistive element is a regenerative motor 280 that is responsive to current signals provided by the resistance controller 260 to adjust its resistive torque. As shown, the regenerative motor 280 is secured to a base plate 290 of the frame 20. The shaft 300 of the regenerative motor 280 engages a transmission member 310, which, in turn, engages a single direction clutch 320 disposed on cross-rods 330 and 335. The cross-rods 330 and 335 collectively extend between a pair of anchor bearings 340 and 350 in a direction transverse to axes 100 and 120.

A transmission member 360 extends about gear mechanism 370 and engages the sliding member 140 at a first end 385 and a spring bias member at a second end 380. As such, the sliding member 140 is biased toward a rear position, corresponding to the position of the third and fourth appendicular members shown in FIG. 7 above.

A further transmission member 390 extends about gear mechanism 400 and engages the sliding member 145 at a first end 410 and a spring bias member at a second end 420. Again, the sliding member 145, like the sliding member 140, is biased toward a rear position. With this configuration, the amount of force needed to extend a given sliding member forward is dependent on the resistive force provided by the regenerative motor 280.

Each of the transmission members 360 and 390 are associated with motion of the corresponding appendicular members. In this example, drive chains are used for the transmission members 310, 360, and 390, although other types of transmission members, such as timing belts, may be used.

Figure 12:
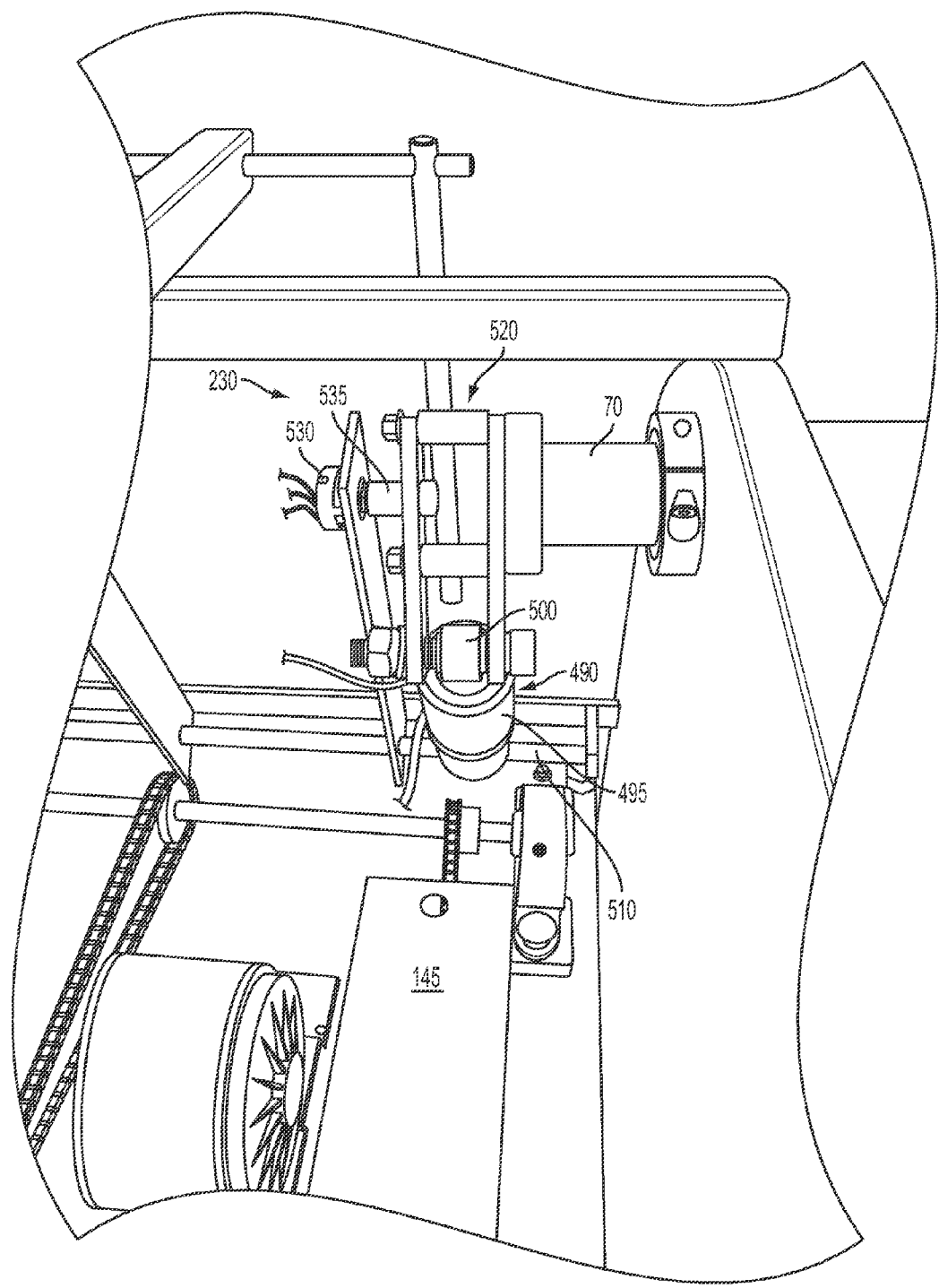
FIGS. 12 and 13 show examples of the resistance members and motion feedback sensors associated with the first and second appendicular members.
Figure 13:
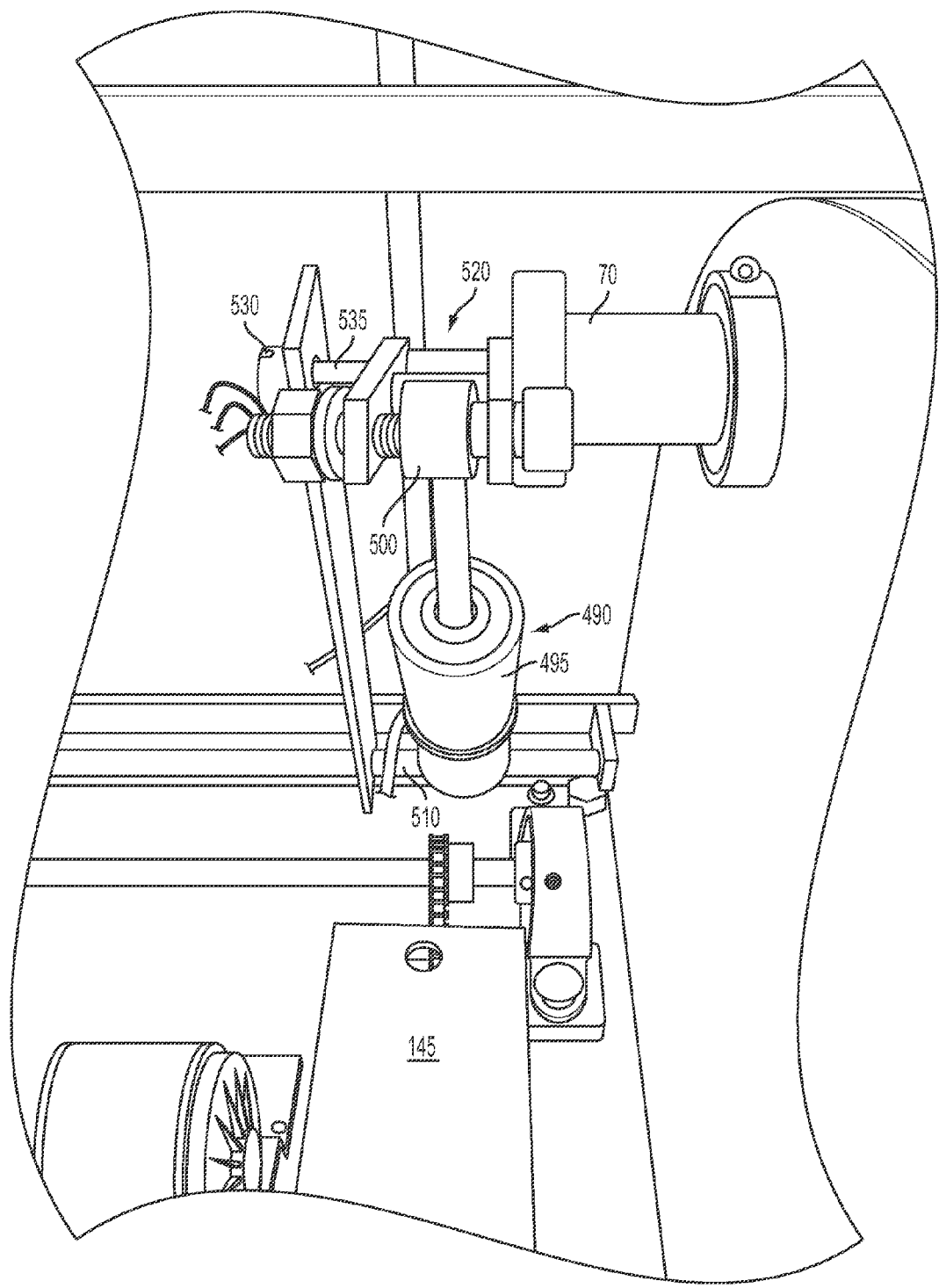

FIGS. 12 and 13 show one manner in which the resistive elements 220 and 230 may be implemented. To reduce repetition, only resistive element 230 is discussed.

In the example shown in FIG. 12, resistive element 230 includes a smart fluid-based actuator 490, which uses a smart-fluid selected from an electro-rheological fluid or a magneto-rheological fluid. The actuator 490 includes a cylinder 495 and a piston 500 disposed within the cylinder 495. A first end of the cylinder 495 is fixed to a cross-rod 510. Opposite the cross-rod 510, the piston 500 engages linkage 520, which extends between the piston 500 and the second appendicular member 70. Rotation of the second appendicular member 70 results in a corresponding linear translation of the piston 500 through the cylinder 495. As such, the actuator 490 controls the resistive force applied to the second appendicular member 70. A rheostat 530 is connected to a rotating shaft 535 of linkage 520 to determine the angular position of the second appendicular member 70. In FIG. 12, the second appendicular member 70 is in the position shown in FIG. 4. In FIG. 13, the second appendicular member 70 is in the position shown in FIG. 3. A similar arrangement may be used to implement resistive element 220 associated with the first appendicular member 50.

Position information for each of the first, second, third, and fourth appendicular members 50, 70, 90, and 110, is detected by at least one sensor. The sensor(s) may be used to feedback the position of the respective appendicular member for use in connection with the workout session controller 270. If the position information is detected over time, the velocity associated with the respective appendicular member may be determined. Further, if the information is determined over time, the acceleration associated with the respective appendicular member may also be determined.

Figure 14:
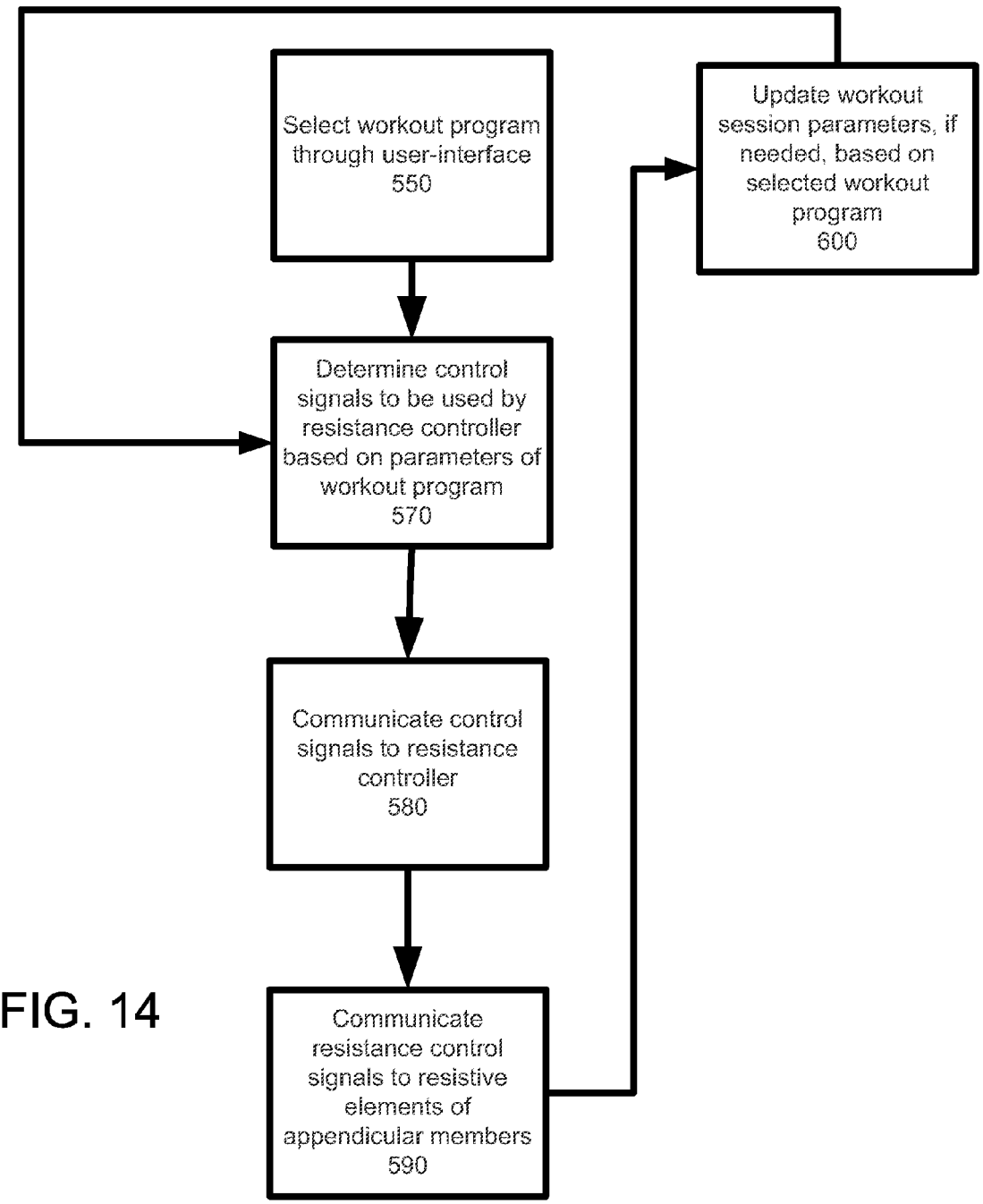
FIG. 14 illustrates operations that may be executed in the example of the system shown in FIG. 10.

FIG. 14 illustrates operations that may be executed by the exemplary system shown in FIG. 10. At operation 550, the user selects a workout program through the user interface, which is then communicated to the workout session controller at operation 560. The control signals to be used by the resistance controller are determined at operation 570 based on parameters of the selected workout program. At operation 580, the control signals are communicated to the resistance controller, which, in turn, communicates resistance control signals corresponding to the control signals received at operation 580 to signals corresponding to the control signals received from the workout session controller. These control signals are sent to the resistive elements associated with the individual appendicular members at operation 590. The workout session controller updates the session parameters, if needed, based on the selected workout program at operation 600. These updates are provided to, or calculated by, the workout session controller at operation 570.

Figure 15:
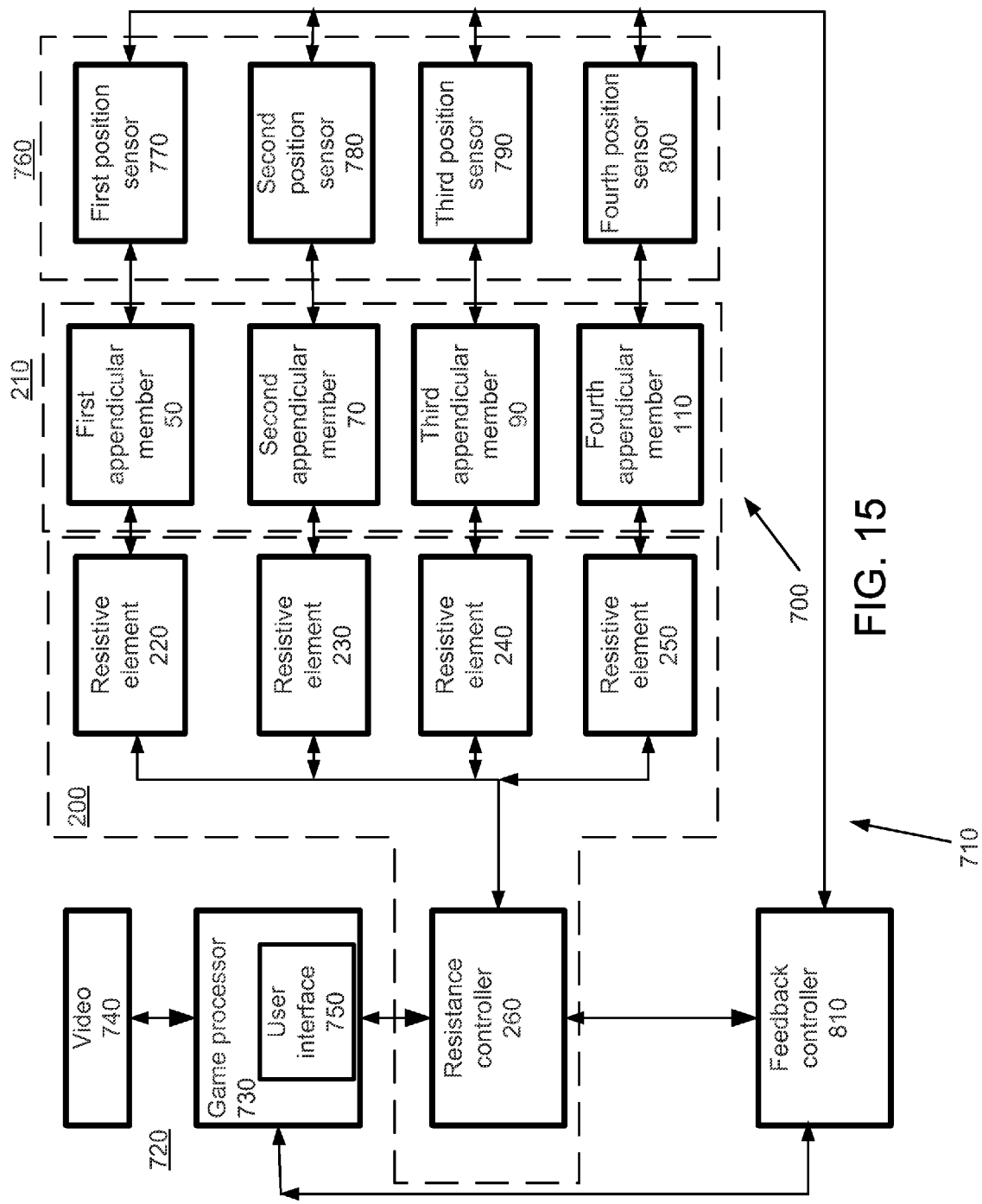
FIG. 15 shows one manner in which the full-body exercise apparatus may be used as a game controller in a workout game system.

FIG. 15 shows one manner in which the full-body exercise apparatus 10 may be used as a full-body game controller 700 in an electronic video game workout system 710. Here, the electronic video game workout system 710 includes a game control system 720, which, in turn, includes a game processor 730 and a video display 740. The game processor 730 is configured to control game play of the electronic video game workout system 710. Game play is shown to the user on, for example, video display 740. The game processor 730 may also include a user interface 750, which may be used to select a particular game for play, adjust the skill and/or physical level of the game, etc. These game play attributes/parameters may be stored and/or accessed from local and/or remote memory storage.

Given that the full-body game controller 700 includes the appendicular members 210, it also includes its corresponding attributes. In this regard, the full-body game controller 700 includes a plurality of independently operable appendicular members configured for engagement with respective limbs of the user. Each of the plurality of appendicular members is movable in a degree of freedom independent of the other ones of the plurality of appendicular members. Since the full-body game controller of FIG. 15 is used as part of the video game, it includes components that place it in electronic communication with the game processor 730 for game play. In the example of FIG. 15, a plurality of sensors 760 (i.e., position sensors, pressure sensors, force sensors, accelerometers, velocity sensors, etc.) are associated with each of the appendicular members. Here, the sensors are in the form of position sensors respectively associated with each of the appendicular members. To this end, the first appendicular member 50 is associated with a first position sensor 770. The second appendicular member 70 is associated with a second position sensor 780. The third appendicular member 90 is associated with a third position sensor 790. The fourth appendicular member 110 is associated with a fourth position sensor 800. The sensor(s) may be used to feedback the position of the respective appendicular member for use in connection with game play of the video game. If the position information is detected over time, the velocity associated with the respective appendicular member may be determined. Further, if the information is determined over time, the acceleration associated with the respective appendicular member may also be determined.

The position sensing signals are provided from the sensors 760 to a feedback controller 810. In this example, the feedback controller 810 and sensors 760 operate as a feedback control system 815. The feedback controller 810, in turn, may provide corresponding signals to the game processor 730 where they are correlated with game rules to execute game play.

The electronic video game workout system 710 also includes a resistance controller 260, which is in electronic communication with the game processor 730. The game processor 730 provides resistance signals to the resistance controller 260 pursuant to executing game play. The resistance game play signals are used by the resistance controller 260 to individually control the resistive force provided by the resistive elements 220, 230, 240, and 250 to the respective appendicular members 50, 70, 90, and 110. As in FIG. 10, the resistance controller 260 controls resistive forces by providing control signals to the resistive elements 220, 230, 240, and 250. The control signals from the resistance controller 260 may be in the form of individual control signals to each of the resistive elements to set the resistive force applied by the resistive elements to their respective appendicular members. The control signals provided to the resistive elements may be in an analog and/or digital format. For example, the control signals may be provided in the form of a current. Adjustable currents are particularly well suited when the resistive element is in the form of a smart-fluid actuator and/or a regenerative motor. Differing electric current magnitudes may be used to control the resistive force provided on each of the plurality of appendicular members so that each appendicular member has a different resistive force. The control signals may also be in a digital format, in which case the digital data transmitted to each resistive element may be converted in-situ at one or more of the plurality of appendicular members to an analog signal.

Figure 16:
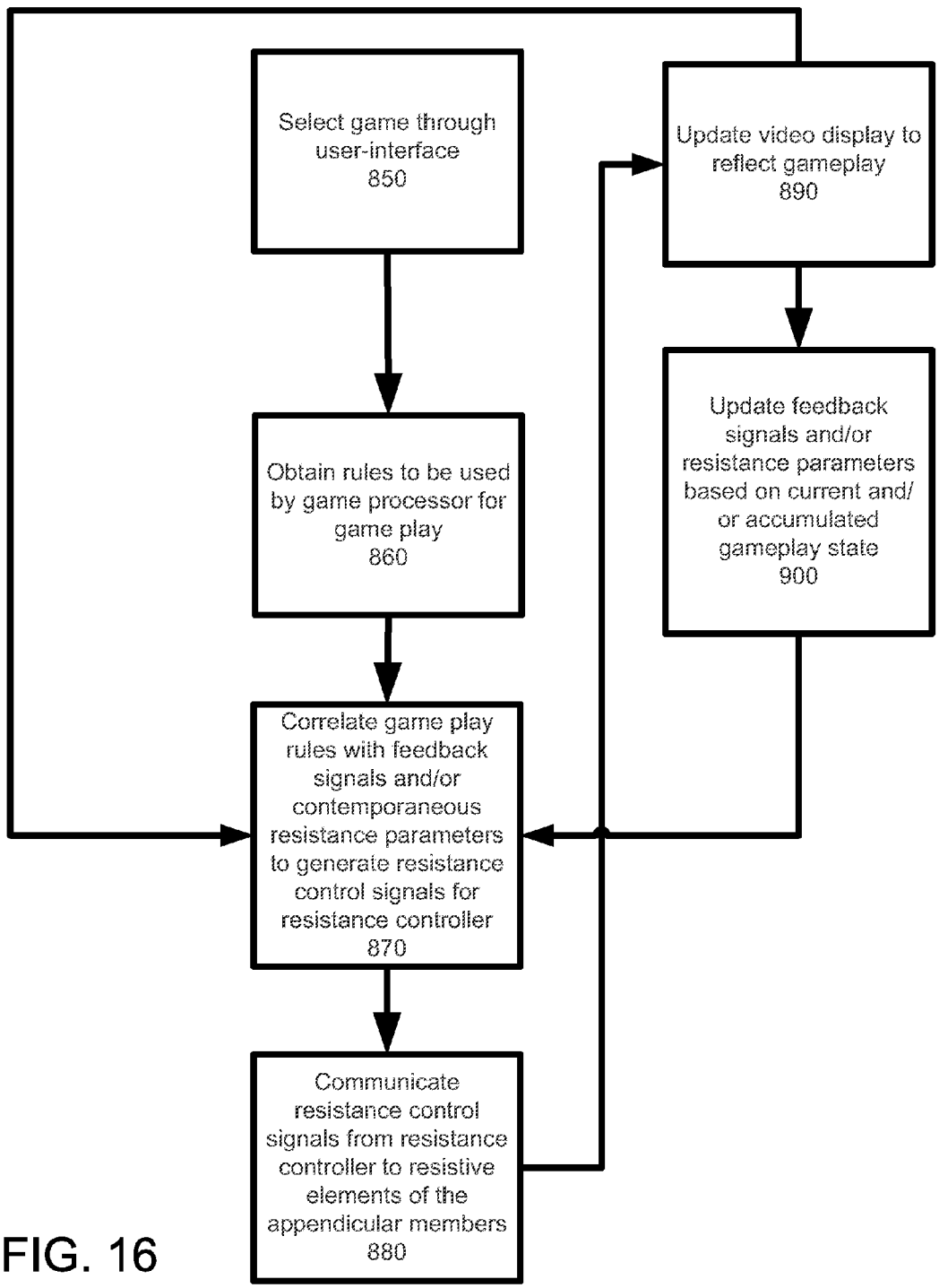
FIG. 16 shows one manner in which the exemplary system of FIG. 15 may be operated.

FIG. 16 shows one manner in which the exemplary system of FIG. 15 may be operated. In FIG. 16, the user selects the game that is to be executed through the user interface at operation 850. The rules to be used by the game controller for executing game play are attained at operation 860. During game play at operation 870, the signals from the feedback controller and/or contemporaneous resistance parameters may be correlated with game play rules to generate updated resistance control signals that are communicated to the resistance controller. For example, if a game character and/or icon of the video game encounter an obstacle, the signals provided to the game controller may be applied to the game play rules and used to update the resistive forces experience by one or more of the appendicular members. The game rules may also include increasing and/or decreasing the resistance experienced by one or more appendicular members when the game character exerts and/or refrains from a particular physical action in the video game (i.e., jumping, running, exhaustion from extended running or other activity, sword fighting, etc.)

In other instances, the resistive elements may be configured to apply a constant resistive force to the appendicular members. Such constant resistive force(s) may be used, for example, when the appendicular members are used by the video game to independently control movement of the game character/icon along various motion axes of the video game. One example of an existing game that may be controlled in this manner is Asteroids®.

At operation 880, the resistance control signals are communicated by the resistance controller to the resistive elements of the appendicular members, and the video display is updated to reflect changes in the game play at operation 890. At operation 900, the feedback signals and/or resistance parameters are updated based on current and/or accumulated game play states. These updated signals are returned to operation 870 for correlation with the game play rules.

Figure 17:
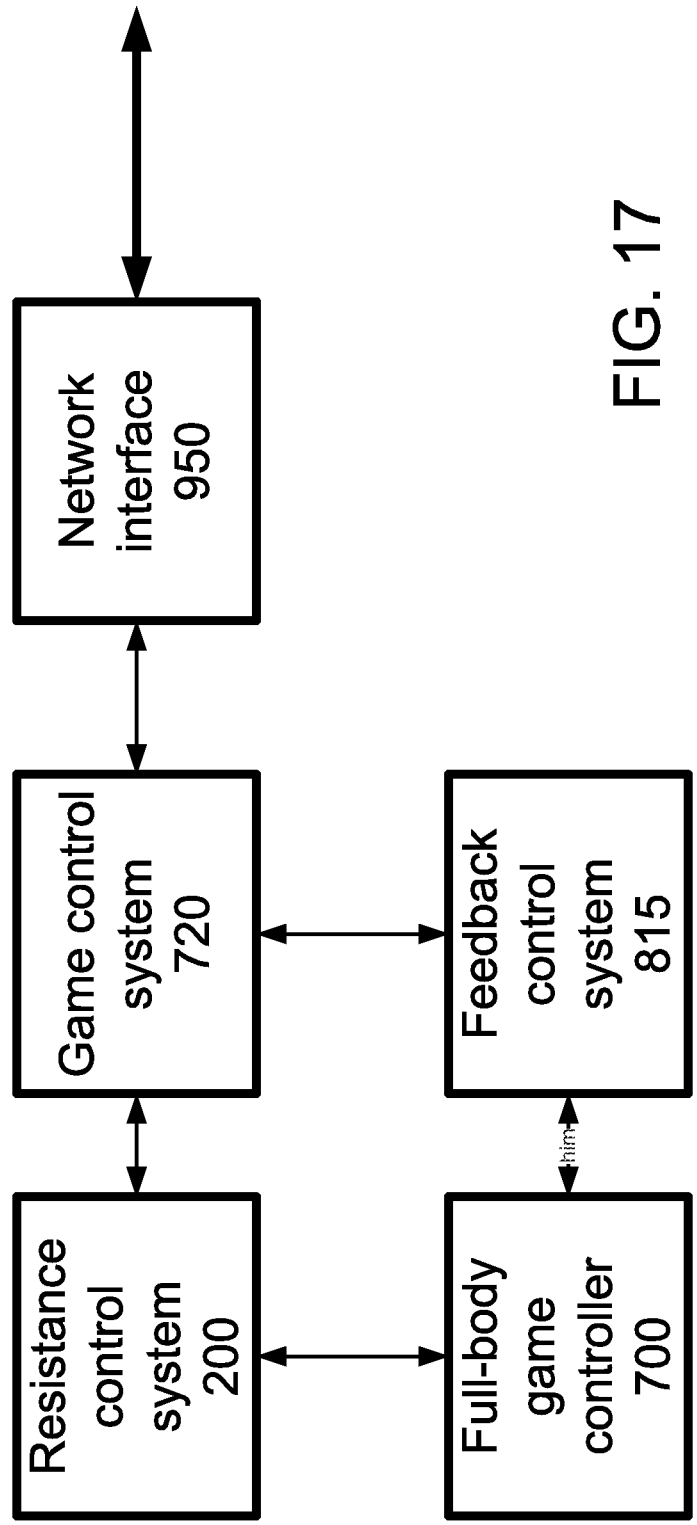
FIG. 17 is a block diagram of one example of a game system having a full-body exercise system that may be networked with other game systems having full-body exercise systems.

FIG. 17 is a block diagram of one example of an electronic video game workout system 710 having a full-body exercise apparatus 10, where the game workout system 710 may be networked with other game systems 710 that likewise have the same or similar full-body exercise systems. As shown, the video game workout system 710 includes a full-body game controller 700. The full-body game controller 700 includes a full-body exercise apparatus 10 (see FIGS. 1-9), a resistance control system 200, and a feedback control system 815. The full-body game controller 700 is in electronic communication with game control system 720, which includes game processor 730, video display 740, and a user interface 750 (see FIG. 15).

A network interface 950 is provided to network a local video game workout system 710 with remote electronic video game workout systems. Remote is not determined by distance between the video game workout systems. Rather, the term remote merely refers to the fact that two separate workout systems are network with one another. In this example, the network interface 950 is in communication with game control system 720. The network interface 950 may be any device used to implement electronic data communication channel between multiple video game workout systems 710 including, but not limited to, an Ethernet interface, a Wi-Fi interface, a point-to-point interface, etc.

Figure 18:
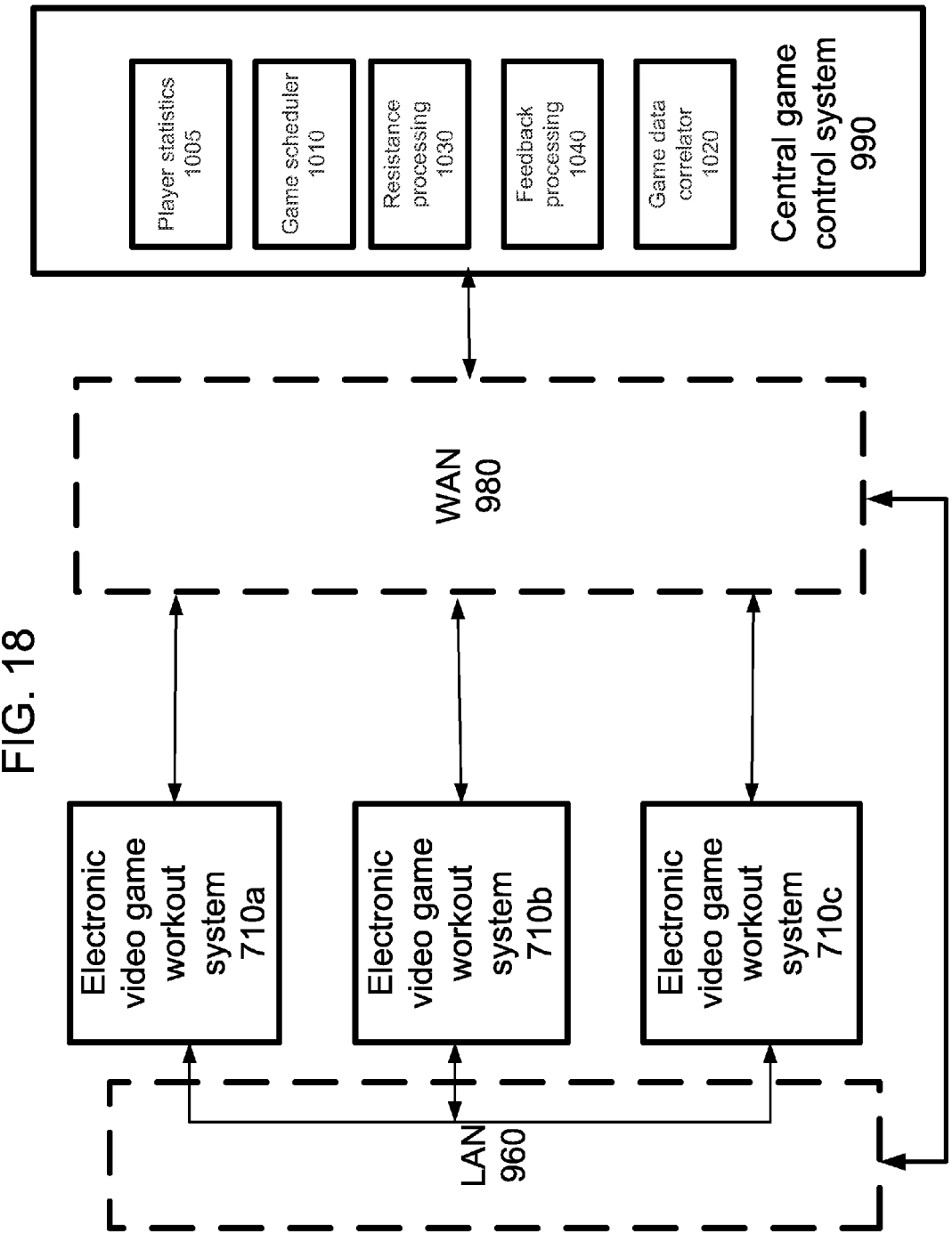
FIG. 18 is a block diagram of a network having multiple game systems of the type shown in FIG. 17.

FIG. 18 is a block diagram of a network having multiple electronic video game workout systems 710 of the type shown in FIG. 17. In this example, at least two of the video game workout systems 710a-c are in electronic data communication with one another over an electronic communication link. The electronic communication link may take any form. For example, the communication link may be established over a local area network 960 and/or over a wide area network 980. In another example, the local area network 960 and wide area network 980 may be in communication with one another to provide various communication paths for information used in executing game play on the video game workout systems 710a-c.

Each electronic video game workout system 710a-c may execute the operations of FIG. 16, with additional modifications for networked play. For the following discussion, workout system 710a will be considered as a local video game workout system and workout system 710b will be considered a remote video game workout system. In addition to the operations shown in FIG. 16, the local video game workout system 710a is modified to correlate game play and data received from the remote video game workout systems 710b to execute game play at the local video game workout system 710a. Further, the local video game workout system 710a transmits game play data to the remote video game workout system 710b, where the data is used to execute game play at the remote video game workout systems 710b.

In most examples, the game processing and correlation are executed by the individual game control systems 720 of the individual video game workout systems 710a-c. To this end, the game control systems 720 of remote video game workout systems 710b correlate the data received from the local video game workout system 710a as well as data generated at the local game workout system 710b to execute game play at the remote video game workout systems 710b. Similarly, the game control system 720 at the local video game workout system 710a correlates the information received from the remote video game workout systems 710b as well as dated generated at the local video game workout system 710a to execute game play at the local video game workout system 710a.

The electronic video game workout systems 710a-c may be placed in electronic data communication with a central game control system 990. In such a system, the video game workout systems 710a-c may optionally include a means of identifying the individual workout system 710a-c and/or the person who is actually using a given individual workout system 710a-c. The identification may be associated with a serial number of the individual workout system. In additionally, or in the alternative, identification of the player may be entered using a data entry device (e.g., a keyboard, smart card, smart phone, etc.). The central game control system 990 may then store performance information associated with players who use the workout systems 710a-c. For example, the central game control system 990 may be configured to store player statistics in a player statistics module 1005. The player statistics module 1005 may use the player statistics to determine the difficulty level of the game rules, resistances, etc., used by the workout system and/or identified player when the workout system 710a-c is engaged for a video game workout. Further, the player statistics module 1005 may also be used to communicate one or more such statistics to either or both a local player and remote player, if desired, for access at the workout systems 710a-c, kiosks, desktops, smart phones, etc.

The central game control system 990 may also include a game scheduler module 1010. The game scheduler module 1010 may be used to facilitate scheduling of video game workout sessions between players. To this end, the game scheduler module 1010 may be used to receive a game request from a player. The game request may be generally broadcast to multiple players or to specific individuals with whom the player wishes to engage in game play. Further, the game scheduler module 1010 may handle the acceptance of such requests, notifications, alarms, etc. Game requests, acceptance, and alarms may be communicated to various individuals using, for example, a smart phone application, a desktop application, an application executed at the electronic video game workout systems 710a-c, or other electronic means of communication.

In some instances, the processing load otherwise used to execute game play locally at the individual video game workout systems 710a-c may be offloaded to components in the central game control system 990. To this end, the central game control system 990 may include a game data correlator module 1020, which is configured to correlate gameplay data received from multiple video game workout systems 710a-c with the game rules. Further, the central game control system 990 may include a resistance-processing module 1030 and feedback-processing module 1040 that cooperate with the game data correlator 1020 to generate resistance signals to the video game workout systems 710a-c and receive feedback signals from the video game workout systems 710a-c. As such, some or all of the data and game correlation for each electronic video game workout system 710a-c takes place at the central game control system 990 thereby reducing the processing requirements of the individual electronic video game workout systems 710a-c.

While the present disclosure has been shown and described with reference to various examples, it will be understood that various changes in form and details may be made without departing from the spirit and scope of the present disclosure as defined by the appended claims.

The invention claimed is:

1. An exercise network system comprising:
an electronic data communication link; and
a plurality of electronic video game workout systems configured for communication with one another over the electronic data communication link to transmit and receive data used for game play at each of the plurality of electronic video game workout systems, at least one of the plurality of electronic video game workout systems being further configured for execution of a full-body workout using a plurality of independently operable appendicular members configured for engagement with respective limbs of a user, wherein each of the plurality of appendicular members is movable in a degree of freedom independent of movement of each other appendicular member of the plurality of appendicular members, and wherein resistance on each of the plurality of appendicular members is adjustable along and/or about its degree of freedom during game play based on locally generated data and data communicated over the electronic data communication link from one or more of another plurality of electronic video game workout systems.

2. The exercise network system of claim 1, wherein each of the plurality of electronic video game workout systems is configured to correlate gameplay rules with feedback signals and/or contemporaneous resistance parameters and, further, with data communicated over the electronic data communication link from at least one other electronic video game workout systems to execute game play.

3. The exercise network system of claim 1 wherein one or more of the plurality of electronic video game workout systems comprises:
   a game processor configured to control game play of the electronic video game;
   a game controller in electronic communication with the game processor, the game controller comprising:
      the plurality of appendicular members, wherein the plurality of appendicular members are configured for respective engagement with legs and arms of a user;
      a resistance control system providing a resistive force on each of the plurality of appendicular members with respect to movement of the legs and arms of the user, wherein the resistive force provided by the resistance control system is adjustable in a generally continuous manner in response to the game play of the electronic video game; and
      a feedback control system responsive to at least one of a motion parameter, a force parameter, and/or a position parameter of each of the plurality of appendicular members to control the game play of the electronic video game.

4. The exercise network system of claim 3, wherein the resistive force on each of the plurality of appendicular members with respect to movement of the legs and arms of the user is adjusted by the resistance control system in a generally continuous manner in response to game play of the electronic video game as determined by the game processor.

5. The exercise network system of claim 4, wherein the game control system obtains game rules to be used by the game processor to execute game play of the electronic video game.

6. The exercise network system of claim 5, wherein the game processor correlates game play rules with feedback signals of the feedback control system and/or contemporaneous resistance parameters of the resistance control system to generate resistance control signals to the resistance control system.

7. The exercise network system of claim 6, wherein the game processor further correlates the game play rules with data received from the one or more other electronic video game workout systems to execute game play of the electronic video game.

8. The exercise network system claim 1, further comprising a player statistics module configured to store player statistics.

9. The exercise network system of claim 8, wherein the player statistics module is configured to determine a level of difficulty for game rules and/or resistances used by one or more of the plurality of electronic video game workout systems for game play.

10. The exercise network system of claim 8, wherein the player statistics module is configured to communicate one or more player statistics to a local player and/or remote player.

11. The exercise network system of claim 10, wherein the statistics module provides the one or more player statistics to a kiosk, a desktop or smart phone.

12. The exercise network system of claim 1, further comprising a game scheduler configured to schedule video games between players.

* * * * *